3,318,732
METHOD FOR THE FRACTIONATION OF STARCH
Dexter French, Ames, Iowa, and Raymond Bertram Evans, Catonsville, Md., assignors to National Starch and Chemical Corporation, New York, N.Y., a corporation of Delaware
No Drawing. Filed Aug. 8, 1963, Ser. No. 300,918
5 Claims. (Cl. 127—70)

This invention relates to a new and improved method for fractionating starch into its two components, amylose and amylopectin.

It is well known that starch in its native state consists of a mixture of two components. One, known as amylose, is characterized by a linear molecular configuration, while the other, known as amylopectin, has a branched molecular structure. In almost all starches, regardless of the particular natural source (e.g. corn, potato, wheat, rice, etc.) one finds this admixture of components. One of the few exceptions is a genetic type of corn, known as waxy maize, wherein the starch is essentially all amylopectin. But the admixture of amylose and amylopectin holds true for most other starch types.

Amylose and amylopectin differ sharply from one another in their properties, largely because of their different molecular configurations. Thus amylose (unless specially treated) does not disperse readily in water, and when it is dispersed in any substantial concentration, the aqueous dispersion quickly retrogrades to a solid, firm gel. Films cast from the aqueous dispersions tend to be quite strong and water resistant. On the other hand, amylopectin disperses readily in water, with ordinary heating, and the dispersions are "stable," that is, they tend to retain the fluid state, without retrogradation, even upon cooling and standing. These disparate properties are valuable for specific industrial applications, and it therefore would be very valuable to be able to employ relatively pure amylose, or relatively pure amylopectin, in applications which call for the characteristics of one or the other of these components.

A number of methods have been proposed for separating ("fractionating") starch into its amylose and amylopectin components. We have now discovered a method which we believe to be superior, in simplicity and efficiency, to the methods heretofore known.

Our method comprises first dispersing starch thoroughly in water, and then treating the thus dispersed starch with a complexing agent which foams a complex with the amylose fraction of the starch, and thus separates it from the dispersion in the form of a precipitate, which may be removed by known means.

The amylose complexing agent is selected from the group consisting of benzene, liquid aliphatic cyclohydrocarbons containing at least 5 carbon atoms and monomethyl derivatives of liquid aliphatic cyclohydrocarbons containing at least 5 carbon atoms.

Representative examples of amylose complexing agents falling within the above-described class include cyclohexane, methyl cyclopentane, cyclooctane, methyl cyclohexane, benzene, cycloheptane, cycloheptene, cycloheptadiene and cyclopentane. Other chemicals falling within the described class will be apparent to the practitioner. Note that the operable cyclic compounds are all non-halogenated.

As the starch to be fractionated, any starch may be used which contains amylose as well as amylopectin. Such starches would include corn, wheat, potato, sago, rice and starches from other natural sources, as well as the so-called high amylose starches. These latter are starches from plant varieties which have been bred to contain a larger proportion of amylose in their starch than in ordinary starches. The proportion of amylose in high amylose starches is of the order of 50%, 55% and even higher, as judged by Iodine Binding Capacity. However, the process of our invention is effective in separating even such high amylose starches into amylose and amylopectin fractions.

As for proportions, the only critical proportion is the amount of complexing agent based on the starch. We have found that it advisable to employ at least 0.05% of the complexing agent, based on the weight of the aqueous starch dispersion to which the complexing agent is to be added. We have employed the complexing agent in various amounts higher than 0.05%, for example 1% and even higher, and there appears to be no critical upper limit. The desirable amount for any particular case will depend upon the starch type employed, the proportion of amylose in that starch, the amount of amylose which it is desired to remove from that starch, and the concentration of the starch in the aqueous dispersion. Obviously, for economic reasons one would not ordinarily employ more complexing agent than necessary.

The amount of starch solids in the aqueous dispersion may vary from a fraction of one percent, by weight, up to that point where the viscosity of the dispersion is such as to raise difficulties in handling. It must be remembered that a relatively small amount of starch, when dispersed in water, causes a measurable thickening. The various starch types differ in the degree to which they thicken such dispersions. Thus, a high amylose starch may be dispersed in somewhat higher concentrations than an ordinary corn starch, to achieve an equivalent viscosity. In general we have found that if one goes substantially beyond 3% starch solids in the aqueous dispersion, viscosity problems become burdensome. The efficiency of the reaction, and the degree of precipitation, are also reduced.

When we employ the term "dispersion" with relation to starch, it should be remembered that when starch, in its native granular state, is heated in water beyond a point known as the gelatinization temperature for the particular starch, the granules swell, lose their internal organization and to a great extent disintegrate in the water, forming a hydrated colloidal dispersion. This is sometimes called a "solution" of the starch, although it is not a true solution in the technical sense. We have found that for the purposes of our process the starch should be dispersed or "dissolved" as completely as possible, in order for the complexing agent to react efficiently with the amylose component of the starch. Since ordinary cooking to or only slightly beyond the gelatinization temperature of the starch appears to leave a certain portion of the granules in a state of incomplete dispersion, we prefer that the starch-water mixture be subjected to temperatures in the order of 212° to 320° F. (here again, the particular temperature depending upon the starch employed) in order to disperse the starch as completely as possible in the water. In practice this involves the use of a closed pressure vessel, such as an autoclave, in order to achieve the desired temperatures in the aqueous system.

After the starch solution has been mixed with the complexing agent, and the amylose complex has precipitated, the precipitate is removed by any convenient means (ordinarily by centrifugation), and the precipitate may be washed with water (preferably containing a small quantity of the complexing agent employed) and dried.

The following examples, without any intent of limiting the scope of the invention, illustrate several embodiments thereof. All parts are by weight, unless otherwise specified.

*Example I*

Thirty parts of high amylose corn starch, containing 70% amylose, were suspended in 1000 parts of water, and cooked in an autoclave at 310–320° F. (about 70 pounds per square inch steam pressure) for 30 minutes, with vigorous stirring. The cooked starch solution was then cooled to about 155–160° F. and there were added, with stirring, 10 parts of cyclohexane (this being equivalent to about 1% of cyclohexane on the weight of the starch solution). The mixture was cooled slowly, with stirring, over a period of 5 to 6 hours, and then permitted to stand overnight. The precipitated amylose fraction was then separated by subjecting the mixture to centrifuging in a supercentrifuge at 25,000 r.p.m. The precipitate was resuspended in water containing 1% (by volume) of cyclohexane and stirred vigorously for about 15 minutes. The precipitate was then suspended in ethanol (in order to achieve partial dehydration), filtered and dried. For every hundred parts of original starch thus treated, 66.6 parts of amylose fraction were recovered. When tested for pure amylose content by defatting and then measuring iodine binding capacity, it was found that this latter value was 172.8 mgs. $I_2$ per gram of sample. This is equivalent to 86.4% pure amylose (on the assumption that pure amylose has an iodine binding capacity of 200 mgs. $I_2$ per gram). The supernatant solution from the centrifuge was precipitated by the addition of 2 volumes of isopropanol, thus recovering an amount of amylopectin equivalent to 29.3% of the weight of the original starch.

*Example II*

Fifteen parts of potato starch were suspended in water and cooked in an autoclave at 260° F. (about 20 p.s.i.) with stirring, for 30 minutes. The amount of water was such as to form a 3% potato starch solution. The solution was cooled to about 170° F., and 5 parts of cyclooctane were added. The mixture was agitated from time to time as it gently cooled, over a 5 hour period. The amount of cyclooctane was equivalent to 1% based on the weight of the starch solution. After standing for 24 hours, to permit settling of the precipitate, the precipitate was separated in a supercentrifuge at 25,000 r.p.m. The thus collected precipitate was washed by resuspension in water and recentrifuging. The amount of the amylose fraction obtained was equivalent to 24% of the weight of the original starch. Of this fraction, 76.2% constituted pure amylose, as measured by the above-described iodine binding capacity test. The amylopectin fraction was recovered by precipitating the supernatant solution from the centrifuge with 2 volumes of isopropanol, filtering and drying.

*Example III*

Thirty parts of a high amylose corn starch, containing 55% to 60% of amylose, were dispersed in 1000 parts water, by heating for 30 minutes at 300–310° F. (approximately 55 p.s.i.). There were then added 10 parts of methylcyclopentane, and the mixture mass was refluxed for 30 minutes. The mixture was then permitted to cool slowly, with stirring. After 24 hours the precipitated amylose complex was separated by centrifuging at 25,000 r.p.m. The precipitate was washed with water containing a small amount of the methylcyclopentane (about 1% by volume) and the precipitate was again separated by centrifuging. The amylose fraction obtained was equivalent to 49% of the weight of the original starch, and of this fraction approximately 85% constituted pure amylose, as measured by the iodine binding capacity test previously described. The supernatant solution from the centrifuge, after precipitation with 2 volumes of isopropanol, yielded 44% (based on the weight of the original starch) of amylopectin.

*Example IV*

A potato starch dispersion was prepared by dispersing 7.3 parts of potato starch in 1000 parts of water, in the manner described in Example II. When the dispersion had been cooled to about 170° F., there were added 2.5 parts of cyclohexane, with agitation. After standing overnight, the precipitated amylose fraction was separated by centrifuging, and was washed and dried. The amount of amylose fraction thus recovered was equivalent to 30.8% of the weight of the original starch, and its amylose content, as determined by the iodine binding capacity method previously described, was approximately 68%. The amylopectin obtained from the supernatant fluid in the centrifuge amounted to 57.8% of the original starch weight.

*Example V*

Thirty parts of high amylose corn containing 55–60% amylose were dispersed in 1000 parts of water, in the manner described in the previous examples. To the dispersion there were added 0.5 part of cyclohexane. After stirring for several hours and then standing overnight, the precipitate was separated, washed and dried. The amount of amylose fraction thus recovered was 36.2% of the original starch weight, and the amylose content of the fraction, on the basis of the iodine binding capacity test heretofore described, was approximately 76%. The amount of amylopectin fraction recovered from the supernatant liquid in the centrifuge was approximately 59% of the weight of the original starch.

*Example VI*

Thirty parts of high amylose corn starch, containing 55–60% amylose, were dispersed in 970 parts water by cooking at 300–310° F., for 30 minutes. After cooling the solution to about 170° F., 10 parts of benzene were slowly added, with stirring. The mixture was cooled slowly over a period of about 8 hours, and allowed to stand at room temperature overnight.

The precipitated amylose fraction was separated from the solution in a supercentrifuge, washed by resuspension in water containing a trace of benzene (about 0.5%) and again centrifuged at high speed. The amylose fraction thus recovered was then dried. The amount of amylose fraction was 37.9% of the original starch weight. After defatting, the fraction was subjected to the test for iodine binding capacity heretofore described, indicating an amylose content of 89%.

With regard to the precipitation of amylopectin from the supernatant liquid resulting from the removal of the amylose fraction, methods for accomplishing such precipitation are well known. Thus, a simple method is to add a sufficient volume of an organic solvent in which the amylopectin is itself insoluble, such as methanol, ethanol or propanol, or one may also add an inorganic salt such as sodium chloride, which aids precipitation. One may also recover amylopectin by evaporation or drying, such as by spray or drum drying.

In general, the amylose complexing agents of our invention are characterized by being hydrophobic, relatively non-polar and volatile. These properties are important because they permit more ready removal of the complexing agents from the reaction mass, as compared to complexing agents heretofore known. It is also believed that our process favors the formation of more stable complexes.

It will be obvious to the practitioner that variations may be made in the materials, procedures and proportions herein set forth, without departing from the scope of the invention, which is limited only by the following claims.

We claim:

1. The method for fractionating starch which consists in dispersing starch in water, adding to said dispersion at least 0.05%, based on the weight of said dispersion, of an amylose complexing agent selected from the class consisting of benzene, cyclohexane, cyclooctane, cycloheptane, cycloheptene, cycloheptadiene, cyclopentane, methyl cyclopentane and methyl cyclohexane, said complexing agent thereupon forming a complex with the amylose fraction of the starch, and separating the resulting precipitated amylose complex.

2. The method for fractionating starch which consists in dispersing starch in water, adding to said dispersion at least 0.5%, based on the weight of said dispersion, of an amylose complexing agent selected from the class consisting of benzene, liquid aliphatic cyclohydrocarbons containing at least five carbon atoms and monomethyl derivatives of liquid cyclohydrocarbons containing at least five carbon atoms, said complexing agent thereupon forming a complex with the amylose fraction of the starch, separating the resulting precipitated amylose complex from the supernatant liquid, and adding alcohol to said supernatant liquid in order to precipitate the amylopectin fraction.

3. The method of claim 1 in which the starch is dispersed in water by heating the starch-water mixture at about 212° to about 320° F.

4. The method of claim 1 in which the starch is a high amylose starch.

5. The method of claim 1 in which the concentration of starch in said starch dispersion is about 3%, by weight.

References Cited by the Examiner

UNITED STATES PATENTS

| | | | |
|---|---|---|---|
| 2,515,096 | 7/1950 | Schoch | 127—71 |
| 3,086,890 | 4/1963 | Sarko et al. | 127—71 X |
| 3,188,237 | 6/1965 | Moshy et al. | 127—69 X |

MORRIS O. WOLK, *Primary Examiner.*

E. G. WHITBY, *Assistant Examiner.*